(12) United States Patent
Choi et al.

(10) Patent No.: US 12,162,996 B2
(45) Date of Patent: Dec. 10, 2024

(54) PRE-SWELLED VINYLACETATE-ETHYLENE BASED REDISPERSIBLE POLYMER POWDER COMPOSITION AND METHOD FOR FABRICATING THE SAME, ASPHALT COMPOSITION COMPRISING THE SAME

(71) Applicant: Wacker Chemie AG, Munich (DE)

(72) Inventors: Yong-Hae Choi, Seongnam-si (KR); DaeKyu Kang, Seongnam-si (KR); Sung Oh, Seongnam-si (KR)

(73) Assignee: Wacker Chemie AG, Munich (DE)

( * ) Notice: Subject to any disclaimer, the term of this patent is extended or adjusted under 35 U.S.C. 154(b) by 759 days.

(21) Appl. No.: 17/293,054

(22) PCT Filed: Jul. 12, 2019

(86) PCT No.: PCT/EP2019/068921
§ 371 (c)(1),
(2) Date: May 12, 2021

(87) PCT Pub. No.: WO2021/008677
PCT Pub. Date: Jan. 21, 2021

(65) Prior Publication Data
US 2021/0403650 A1 Dec. 30, 2021

(51) Int. Cl.
| | |
|---|---|
| *C08L 95/00* | (2006.01) |
| *C08J 3/11* | (2006.01) |
| *C08J 3/12* | (2006.01) |
| *C08K 3/013* | (2018.01) |
| *C08K 5/00* | (2006.01) |
| *C08L 23/08* | (2006.01) |
| *C08L 31/04* | (2006.01) |
| *C08L 91/00* | (2006.01) |
| *C08K 3/26* | (2006.01) |

(52) U.S. Cl.
CPC . *C08J 3/11* (2013.01); *C08J 3/12* (2013.01); *C08K 3/013* (2018.01); *C08K 5/0025* (2013.01); *C08L 23/0853* (2013.01); *C08L 31/04* (2013.01); *C08L 91/00* (2013.01); *C08L 95/00* (2013.01); *C08K 2003/265* (2013.01); *C08L 2555/60* (2013.01); *C08L 2555/80* (2013.01)

(58) Field of Classification Search
None
See application file for complete search history.

(56) References Cited

U.S. PATENT DOCUMENTS

| | | | | |
|---|---|---|---|---|
| 2011/0269876 A1* | 11/2011 | Rowe | ...... | C08L 95/00 524/229 |
| 2016/0333183 A1* | 11/2016 | Murthy | ...... | C08L 31/04 |

FOREIGN PATENT DOCUMENTS

| | | | |
|---|---|---|---|
| CN | 101891916 | * | 11/2010 |
| CN | 105153532 | * | 12/2015 |
| CN | 106496915 | * | 3/2017 |
| WO | 10057888 A1 | | 5/2010 |
| WO | 16183144 A1 | | 11/2016 |

OTHER PUBLICATIONS

Wang, The Thermal and Mechanical Properties of Poly(ethylene-co-vinyl acetate) Random Copolymers . . . ; Polymers 2019, 11, 1055 pp. 1-18. (Year: 2019).*
Fox T. G., Bull. Am. Physics Soc. 1, 3, p. 123 (1956).
Polymer Handbook 2nd Edition, J. Wiley & Sons, New York (1975).
Press Release: ECS and MECS 2019, Wacker, Feb. 7, 2019, XP055602553.
Product Overview Vinnapas Polymer Powders and Dispersions, Apr. 18, 2015, pp. 1-34, XP055616431.

* cited by examiner

Primary Examiner — David J Buttner (57) ABSTRACT

A redispersible polymer powder composition includes at least one solvent selected from a process oil and an organic solvent, and a vinylacetate-ethylene (VAE)-based redispersible polymer powder pre-swelled by the solvent. The swelling ratio of the vinylacetate-ethylene (VAE)-based redispersible polymer powder exceeds 55%, measured by the equation swelling ratio (%)=$[(B-A)/A] \times 100$, where A is the initial mass of the vinylacetate-ethylene (VAE)-based redispersible polymer powder before adding the solvent, and B is the swelled mass of the vinylacetate-ethylene (VAE)-based redispersible polymer powder after adding the solvent and stirring at 300 rpm at room temperature (20° C.) for 30 minutes provided that the mixing ratio of the vinylacetate-ethylene (VAE)-based redispersible polymer powder and the solvent is 1:1 by weight.

11 Claims, 5 Drawing Sheets

| | | | | | | | |
|---|---|---|---|---|---|---|---|
| #22 | | Pass | | Pass | | Pass | |
| #21 | | Pass | | Pass | | Pass | |
| #20 | | Pass | | Pass | | Pass | |
| #19 | | Pass | | Pass | | Pass | |
| #18 | | Pass | | Pass | | Pass | |
| #17 | | Pass | | Pass | | Crack | |
| #16 | | Pass | | Pass | | Crack | |
| #15 | | Pass | | Pass | | Crack | |
| #14 | | Pass | | Pass | | Pass | |
| #13 | | Crack (5°C) | — | — | — | — | |
| | -10°C | | -15°C | | -20°C | | |

PRE-SWELLED VINYLACETATE-ETHYLENE BASED REDISPERSIBLE POLYMER POWDER COMPOSITION AND METHOD FOR FABRICATING THE SAME, ASPHALT COMPOSITION COMPRISING THE SAME

TECHNICAL FIELD

Embodiments of the present invention relate to a redispersible polymer powder composition including a pre-swelled vinylacetate-ethylene (VAE)-based redispersible polymer powder, to a method of fabricating the redispersible polymer powder composition, and to an asphalt composition including the redispersible polymer powder composition to secure excellent compatibility and miscibility and high workability and processability.

BACKGROUND ART

Asphalt or bitumen (called "asphalt" herein), are terms used to describe the residue left over from the petrochemical refining process. Asphalt is used in a variety of applications, for uses such as, but not limited to, paving, sealing, coating, roofing, waterproofing, and draining, and as weather barriers.

Asphalt without polymer modification is typically soft at room temperature, and tends to be brittle at lower temperatures, therefore lacking properties for use on its own in some of the applications mentioned above. A general strategy to modify the asphalt is input polymers and/or additives.

Many studies have been conducted on polymer modified asphalt (PMA) to improve the performance of asphalt. Asphalt modifying additives are used to improve the quality and compatibility of the asphalt. The most important requirement of the polymer used as the asphalt modifying additives is its compatibility with asphalt. This is because excellent compatibility with asphalt may shorten processing time and improve physical properties.

Examples of polymer modifiers widely in use currently may include styrene-based copolymers including, for example, styrene/butadiene copolymers (SBR) and styrene butadiene/styrene copolymers (SBS). Such a rubber-based material has an advantage that it has excellent properties such as elasticity, durability, abrasion resistance, impact resistance, and low temperature characteristics.

In an embodiment, polymer modifiers such as SBR/SBS should be melted before use. To this end, not only it is necessary to heat the polymer modifier at a high temperature of 160° C. or higher in advance, but also it takes a long time of at least 5 hours or more to melt. Even if it is melted, it takes a long time to be mixed with another material, and a high-speed stirring homogenizer of 1,000 to 3,000 rpm should be used. As described above, since the SBR/SBS-based polymer modifier requires special production processes and conditions, problems such as an increase in processing costs and a decrease in productivity are caused. Currently, a process of pre-swelling the SBR/SBS-based polymer modifier may be introduced before use by employing, for example, a petrochemical solvent, but it requires a further aftertreatment process, so the problems of cost increases and human harmful issues are still not solved.

DETAILED DESCRIPTION OF THE INVENTION

Technical Problem

The inventors selected vinylacetate-ethylene (VAE)-based redispersible polymers that have excellent adherence performance and environmental friendliness over styrene-based copolymer modifiers, thus applicable to various fields. It was found that when the vinylacetate-ethylene (VAE)-based redispersible polymer is pre-swelled before use, it exhibits excellent compatibility and miscibility, and high workability and processability.

BRIEF SUMMARY

Embodiments of a redispersible polymer powder composition are described below. In an embodiment, the redispersible polymer powder composition comprises at least one solvent selected from a process oil and an organic solvent, and a vinylacetate-ethylene (VAE)-based redispersible polymer powder pre-swelled by the solvent. The swelling ratio of the vinylacetate-ethylene (VAE)-based redispersible polymer powder exceeds 55%, measured by the equation swelling ratio (%)=[(B−A)/A]×100, where A is the initial mass of the vinylacetate-ethylene (VAE)-based redispersible polymer powder before adding the solvent, and B is the swelled mass of the vinylacetate-ethylene (VAE)-based redispersible polymer powder after adding the solvent and stirring at 300 rpm at room temperature (20° C.) for 30 minutes provided that the mixing ratio of the vinylacetate-ethylene (VAE)-based redispersible polymer powder and the solvent is 1:1 by weight.

BRIEF DESCRIPTION OF THE SEVERAL VIEWS OF THE DRAWING

The above, as well as other advantages of the present invention will become readily apparent to those skilled in the art from the following detailed description when considered in the light of the accompanying drawings in which.

Thus, aspects of the present invention are direct to a pre-swelled vinylacetate-ethylene (VAE)-based redispersible polymer powder, to a method of fabricating the redispersible polymer powder composition, and an asphalt composition including the redispersible polymer powder composition.

Technical Solution

An embodiment of the present invention provides a redispersible polymer powder composition, the composition including: at least one solvent selected from a process oil and an organic solvent; and a vinylacetate-ethylene (VAE)-based redispersible polymer powder pre-swelled by the solvent. A swelling ratio of the vinylacetate-ethylene (VAE)-based redispersible polymer powder measured by the following Equation 1 exceeds 55%:

$$\text{Swelling ratio (\%)} = [(B-A)/A] \times 100, \quad \text{[Equation 1]}$$

where A is an initial mass of the vinylacetate-ethylene (VAE)-based redispersible polymer powder before adding the solvent, and B is a swelled mass of the vinylacetate-ethylene (VAE)-based redispersible polymer powder after adding the solvent and stirring at 300 rpm at room temperature (20° C.) for 30 minutes provided that a mixing ratio of the vinylacetate-ethylene (VAE)-based redispersible polymer powder and the solvent is 1:1 by weight.

According to an embodiment, the mixing ratio of the vinylacetate-ethylene (VAE)-based redispersible polymer powder and the solvent may be 50 to 99.5:50 to 0.5 by weight.

According to an embodiment, the vinylacetate-ethylene (VAE)-based redispersible polymer powder may include: a vinylacetate-ethylene (VAE)-based copolymer having a vinylacetate (VA) content greater than 50 weight percent (wt %) with respect to the total weight of the copolymer; and a filler.

According to an embodiment, the vinylacetate-ethylene (VAE)-based copolymer may have a VA content more than 50 wt % and substantially equal to or less than 99 wt %, and have an ethylene content substantially equal to or more than 1 wt % and less than 50 wt %.

According to an embodiment, the vinylacetate-ethylene (VAE)-based copolymer has a glass transition temperature (Tg) in a range from −40 to 40° C.

According to an embodiment, the filler may include an organic filler, an inorganic filler, or a mixture thereof.

According to an embodiment, a content of the filler may be in a range from 0.1 to 30 wt % with respect to 100 wt % of the vinylacetate-ethylene (VAE)-based redispersible polymer powder.

According to an embodiment, the process oil may include at least one selected from the group consisting of: a naphthenic oil, a paraffinic oil, an olefin-based oil, an aromatic oil, a mineral oil, a vegetable oil, a synthetic oil, a lubricating oil, and a regeneration oil.

According to an embodiment, the organic solvent may include at least one selected from the group consisting of a hydrocarbon-based solvent, a halogenated hydrocarbon-based solvent, an alcohol-based solvent, an aldehyde-based solvent, an ether-based solvent, an ester-based solvent, a ketone-based solvent and a glycol-based solvent.

According to an embodiment, the composition may further include 0.1 to 12 parts by weight of a crosslinking agent with respect to 100 parts by weight of the composition.

According to an embodiment, the crosslinking agent may include at least one selected from the group consisting of an organic peroxide crosslinking agent, a silane crosslinking agent, an azo crosslinking agent, a polyisocyanate crosslinking agent, sulfur and a sulfide.

An embodiment of the present invention provides a method of fabricating the redispersible polymer powder composition, the method including: mixing a vinylacetate-ethylene (VAE)-based redispersible polymer powder and a solvent at a weight ratio of 50 to 99.5:50 to 0.5, and then stirring the vinylacetate-ethylene (VAE)-based redispersible polymer powder and the solvent at a temperature in a range from 20 to 180° C. for 0.2 to 3 hours.

According to an embodiment, the vinylacetate-ethylene (VAE)-based redispersible polymer powder may include: 70 to 99.9 wt % of a vinylacetate-ethylene (VAE)-based copolymer; and 0.1 to 30 wt % of a filler, with respect to the total weight of the redispersible polymer powder.

According to an embodiment, a mixer or a homogenizer is used in stirring of the vinylacetate-ethylene (VAE)-based redispersible polymer powder and the solvent.

An embodiment of the present invention provides an asphalt composition, the asphalt composition including: an asphalt; and the redispersible polymer powder composition.

According to an embodiment, the asphalt composition may satisfy at least one of the followings conditions (i) to (iii): (i) a maximum viscosity (based on 135° C.) measured in accordance with the ASTM D4402 standard is substantially equal to or less than 5,000 cps, (ii) a low-temperature cracking temperature measured in accordance with the ASTM D790 standard is substantially equal to or lower than −15° C., and (iii) a surface tackiness of an asphalt film fabricated in accordance with the BS 3900 standard is substantially equal to or less than 3.

Advantageous Effects

An embodiment of the present invention may exhibit excellent compatibility and miscibility, and high workability and processability by using a pre-swelled vinylacetate-ethylene (VAE)-based redispersible polymer powder. Accordingly, the production process and time required for producing the redispersible polymer powder may be significantly reduced, as compared to those of conventional polymer modifiers, thereby lowering the production cost and increasing the productivity.

In addition, an embodiment of the present invention may exhibit a performance equal to or higher than that of conventional styrene-based polymer modifiers, without degrading physical properties.

The effects of the present invention are not limited by the contents exemplified above, and more various effects are included in the specification.

MODE FOR CARRYING OUT THE INVENTION

Hereinafter, the present invention will be described in detail. However, it should be understood that the present invention is not limited to the following embodiments, and that various elements may be variously modified or selectively mixed according to need. Accordingly, it is to be understood that the invention includes all modifications, equivalents, and alternatives falling within the spirit and scope of the present invention.

The term "composition" as used herein includes not only a mixture of materials containing the composition, but also reaction products and decomposition products formed from the materials of the composition. The term "polymer" as used herein also refers to polymeric compounds made by polymerizing monomers, whether of the same type or of a different type. Accordingly, the term "polymer" as described herein refers to a homopolymer (used to refer to a polymer made from only one type of monomer while understanding that trace impurities can be incorporated into the polymer structure), and the interpolymer defined later.

In addition, throughout this specification, when an element is referred to as "including" an element, it is understood that it may include other elements as well, not meaning excluding other elements unless specifically stated otherwise. The terms "about", "substantially", and the like used in the present specification are to be understood, when manufacturing and material tolerances inherent in the meanings mentioned are presented, as they mean "the numerical value" or "in close proximity to the numerical value", and not in a limiting sense.

Unless defined otherwise, all terms (including technical and scientific terms) used herein may be used in a sense commonly understood by one of ordinary skill in the art to which this invention belongs. Also, commonly used pre-defined terms are not ideally or excessively interpreted unless explicitly defined otherwise.

<Redispersible Polymer Powder Composition>

A redispersible polymer powder composition according to an embodiment of the present invention includes at least one solvent selected from a process oil and an organic solvent; and vinylacetate-ethylene (VAE)-based redispersible polymer powder swelled in the solvent.

Figure 1:
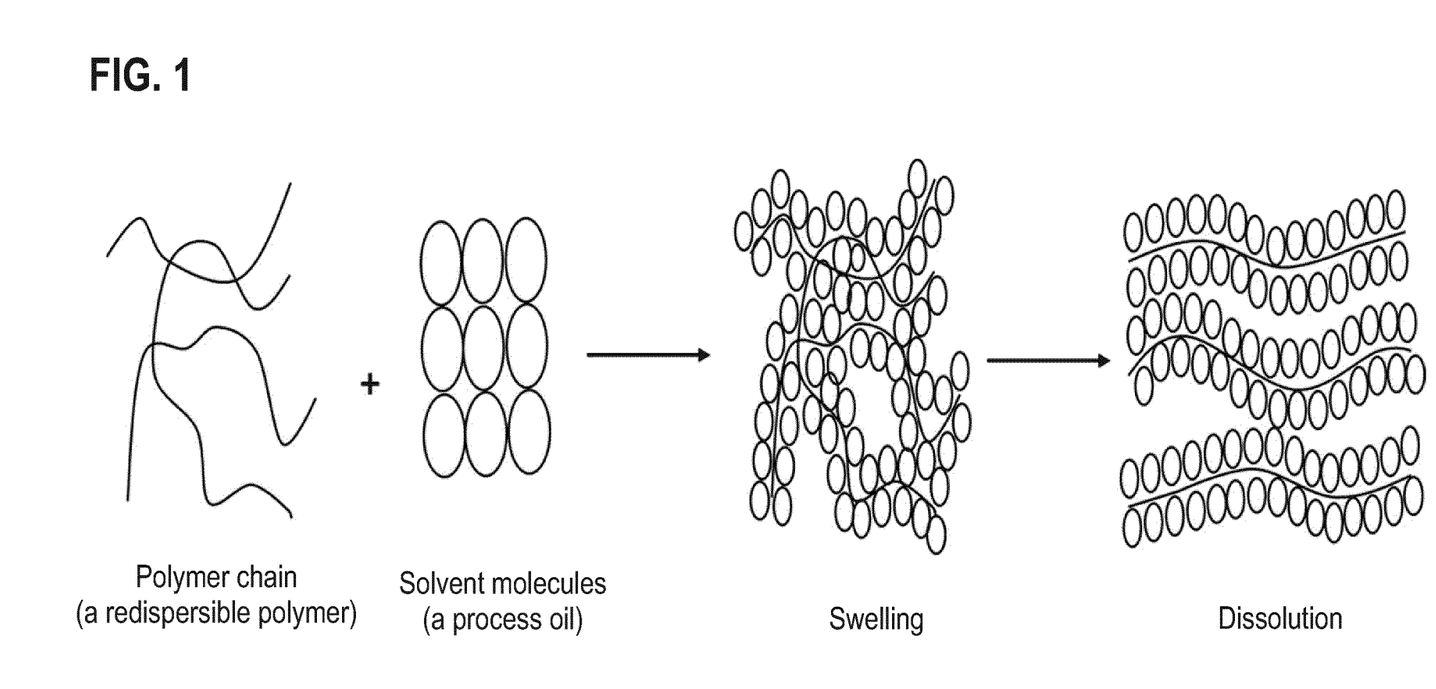
FIG. 1 is a schematic diagram showing a swelling and dissolution process of a polymer.

As used herein, swelling is a phenomenon in which a substance absorbs a solvent and swells, which may be seen when a polymer substance is dissolved. As illustrated in FIG. 1, a polymer material has a strong interaction between polymer chains in a solid state, but when immersed in a solvent, solvent molecules intercalate between the polymer chains, and the polymer material swells in the form of a gel. Then, the polymer chains surrounded by the solvent molecules are separated from each other one by one, such that the polymer material is dispersed and dissolved in the solvent.

Dissimilar to other conventional polymer modifiers, the vinylacetate-ethylene (VAE)-based redispersible polymer powder according to the present invention exhibits a predetermined swelling ratio before use. In the present invention, a swelling ratio may be a percentage of the swelling ratio measured by the above Equation 1 using a process oil or an organic solvent used for the same purpose as the process oil. In specific, in the above Equation 1, a swelled mass means a mass of a swelled redispersible polymer which remains after mixing the vinylacetate-ethylene (VAE)-based redispersible polymer power and the solvent at a weight ratio of 1:1, stirred at 300 rpm at room temperature (20° C.) for 30 minutes, and then filtered with a filter paper at room temperature (20° C.).

The swelling ratio of the vinylacetate-ethylene (VAE)-based redispersible polymer powder according to the present invention may exceed 55%, specifically in a range from 60 to 95%, more specifically in a range from 70 to 90%. In such a case, the swelling ratio is based on that a mixing ratio of the vinylacetate-ethylene (VAE)-based redispersible polymer powder and the solvent is 1:1 by weight, and when the mixing ratio is changed, a value of the swelling ratio may also be changed.

In one embodiment, the pre-swelled vinylacetate-ethylene (VAE)-based redispersible polymer powder includes vinylacetate-ethylene (VAE)-based copolymers and fillers.

The vinylacetate-ethylene (VAE)-based copolymer may use any vinylacetate-ethylene (VAE)-based copolymer that includes vinylacetate (VA) polymerization units and ethylene polymerization units that are known in the art without limitation, and in which a VA content is more than 50 wt % with respect to the total weight of the copolymer.

The redispersible polymer powder are based, in general, on vinyl acetate/ethylene (VAE)-based copolymer having a vinyl acetate content of more than 50% by weight, preferably 52% by weight, more preferably 55% by weight, and an ethylene content of less than 50% by weight, preferably 1 to 40% by weight, and optionally further monomers copolymerizable therewith, in each case based on the total weight of the monomer mixture, and the figures in % by weight totaling 100% by weight in each case. According to an exemplary embodiment of the present invention, the vinyl acetate-ethylene (VAE)-based copolymer has a vinyl acetate (VA) content of more than 50 weight percent (wt %) by weight and 99 wt % by weight or less; and an ethylene content of 1 wt % by weight or more and less than 50 wt % by weight based on the total weight of the vinyl acetate/ethylene (VAE)-based copolymer.

Suitable further vinyl ester monomers are vinyl higher esters, for example those of carboxylic acids having 3 to 15 carbon atoms. Suitable further monomers from the group of acrylic esters or methacrylic esters include, for example, esters of unbranched or branched alcohols having 1 to 15 carbon atoms. Preferred vinylaromatic further monomers are styrene, methylstyrene, and vinyltoluene. A preferred vinyl halide further monomer is vinyl chloride. The preferred olefin further monomers are propylene and butylene, and the preferred dienes are 1,3-butadiene and isoprene.

Optionally, it is also possible for 0.1 to 10 wt % of auxiliary monomers to be copolymerized, with respect to the total weight of the monomer mixture. Preference is given to using 0.1 to 5 wt % of optional auxiliary monomers. Examples of optional auxiliary monomers are ethylenically unsaturated monocarboxylic and dicarboxylic acids, ethylenically unsaturated carboxamides and carbonitriles, and also maleic anhydride, and ethylenically unsaturated sulfonic acids and their salts. Other examples of optional auxiliary monomers are precrosslinking comonomers such as polyethylenically unsaturated comonomers, or post crosslinking comonomers, examples being N-methylolacrylamide (NMA), and N-methylolmethacrylamide (NMMA). Also suitable are epoxide-functional comonomers such as glycidyl methacrylate and silicon-functional comonomers such as methacryloyloxypropyltrialkoxysilanes, and vinyltrialkoxysi-lanes.

Preference is given to copolymers of 60 to 99 wt % of vinylacetate with 1 to 40 wt % of ethylene;

Copolymer of more than 50 wt % of vinylacetate with 1 to 40 wt % of ethylene and one or more further comonomers from the group of the vinyl esters having 1 to 12 carbon atoms in the carboxyl radical, such as vinyl propionate, vinyl laurate, and vinyl esters of alpha-branched carboxylic acids having 5 to 12 carbon atoms, such as VeoVa9® and VeoVa10® (trade names of Hexion).

Copolymer of more than 50 wt % of vinylacetate, 1 to 40 wt % of ethylene and one or more further comonomers from the group of (meth)acrylic esters of unbranched or branched alcohols having 1 to 15 carbon atoms, especially methyl methacrylate, methyl acrylate, n-butyl acrylate and 2-ethylhexyl acrylate; where the copolymers may each also contain the auxiliary monomers mentioned in the amounts mentioned, and the figures in wt % total 100 wt % in each case.

The monomer selection and the selection of the weight fractions of the comonomers are preferably selected so as to result in glass transition temperatures, Tg, ranging from −40° C. to +40° C., more preferably −40° C. to +25° C., and most preferably −20° C. to +20° C. The Tg of the polymers may be determined in a known way by means of Differential Scanning calorimetry (DSC, DIN EN ISO 11357-1/2), for example, determined with a calorimeter DSC from Mettler-Toledo, with a heating rate of 10 K/min as midpoint temperature. The Tg may also be calculated approximately in advance using the Fox equation. According to Fox T. G., Bull. Am. Physics Soc. 1, 3, page 123 (1956), the following is the case: $1/Tg = x_1/Tg_1 + x_2/Tg_2 + \ldots + x_n/Tg_n$, where $x_n$ stands for the mass fraction (wt %/100) of the monomer n, and $Tg_n$ is the glass transition temperature, in degrees Kelvin, of the homopolymer of the monomer n. Tg values for homopolymers are listed in Polymer Handbook 2nd Edition, J. Wiley & Sons, New York (1975).

The polymers are generally prepared in an aqueous medium and preferably by the emulsion or suspension polymerization process, as described, for example, in WO 2010/057888 A1. The polymers in that case are obtained in the form of aqueous dispersions. In the polymerization, it is possible to use the customary protective colloids and/or emulsifiers, as described in WO 2010/057888 A1.

As protective colloids preference is given to partially hydrolyzed or fully hydrolyzed polyvinyl alcohols, having a degree of hydrolysis of 80 to 100 mol %, more particularly to partially hydrolyzed polyvinyl alcohols having a degree of hydrolysis of 80 to 94 mol % and a Höppler viscosity, in 4% strength aqueous solution, of 1 to 30 mPa·s (Höppler method at 20° C., DIN 53015). The stated protective colloids may be obtained by methods known to the skilled person, and are added generally in an amount of in total 1 to 20 wt %, with respect to the total weight of the monomers, in the polymerization.

The polymers in the form of aqueous dispersions will be dried in a conventional manner. In a preferred embodiment, the polymers may be converted to water-dispersible polymer powders by the spray-drying process, as described in WO 2010/057888 A1, for example. In that case it is usual to add a drying aid in a total amount of 3 to 30 wt %, based on the polymeric constituents of the dispersion. Preferred drying aids are the abovementioned polyvinyl alcohols. Additionally, anti-blocking agent may be added during or after the drying step.

The polymer powders are commercially available, for example, as Vinnapas® and ETONIS® dispersion powders of Wacker Chemie AG.

The vinylacetate/ethylene (VAE)-based copolymer may also be prepared by other methods, including solution polymerization, or bulk (neat) polymerization. Copolymer prepared by solution or bulk polymerization are preferably supplied in a form having a relatively high surface area. For this purpose, for example, the copolymer may be extruded into pellets or granules by conventional processes or otherwise prepared in small particle sizes. The use of water-dispersible powders resulting from emulsion or suspension polymerization followed by drying, in particular, spray drying, reduces asphalt blending time significantly, and thus water dispersible powders are highly preferred.

In an embodiment, the vinylacetate-ethylene (VAE)-based copolymer is in the form of solid powder, but because it is composed of polymer, surface cohesion is high and the particle size is not uniform and may be coarsened. In order to have a uniform powder size and shape, the vinylacetate-ethylene (VAE)-based redispersible polymer powder may include a filler.

The filler may use any conventional filler known in the art without limitation, and may be, for example, an inorganic filler, an organic filler, or a mixture thereof.

Non-limiting examples of the inorganic fillers may include silica, alumina, barium sulfate, calcium carbonate ($CaCO_3$), magnesium hydroxide, alumina hydroxide, titanium dioxide, clay, mica, wollastonite, talc, magnesium carbonate, carbon black, graphite, carbon nanotubes, or nanosilver. The above-mentioned components may be used singly or in combination of two or more. It may preferably be calcium carbonate.

Non-limiting examples of the organic filler may include organic bentonite, polyethylene wax, polypropylene wax, polymethyl methacrylate, polyurethane, silicone resin powder, micronized polyamide, styrene-ethylene/butylene-styrene block copolymers, and rosin esters. These may be used singly or in combination of two or more.

An average particle diameter $D_{50}$ of the filler is not particularly limited, and may be appropriately adjusted within a range of the ordinary particle size applicable in the art. For example, the average particle diameter $D_{50}$ of the filler may be in a range from 1 μm to 30 μm, and specifically in a range from 1 μm to 20 μm. A shape of the filler is not particularly limited, and examples thereof may include spherical, granular, plate, scaly, whisker, rod, filament, or irregular shapes. The inorganic particles having such shapes may be used singly or in combination of two or more. In addition, the filler may also be coated with a surface treating agent such as a coupling agent and a conventional polymer.

A content of the filler is not particularly limited, and may be appropriately adjusted in consideration of the uniformity and physical properties of the vinylacetate-ethylene (VAE)-based redispersible polymer powder. For example, the filler may be included in an amount from 0.1 to 30 wt %, and specifically in a range from 1 to 20 wt %, with respect to the total weight of the vinylacetate-ethylene (VAE)-based dispersible polymer powder.

In the redispersible polymer powder composition according to the present invention, a content of the vinylacetate-ethylene (VAE)-based redispersible polymer powder is not particularly limited. For example, the vinylacetate-ethylene (VAE)-based redispersible polymer powder may be included in an amount of 50 to 99.5 wt %, and specifically 60 to 99.5 wt %, with respect to the total weight of the vinylacetate-ethylene (VAE)-based redispersible polymer powder and the solvent. In a case where the content of the vinylacetate-ethylene (VAE)-based redispersible polymer powder is within the above-mentioned range, the swelling ratio may be appropriately adjusted without degrading the physical properties, thereby exhibiting excellent compatibility and workability.

The redispersible polymer powder composition according to an embodiment of the present invention includes a solvent as a sweller of the vinylacetate-ethylene (VAE)-based redispersible polymer powder.

As used herein, the solvent refers to a process oil or a conventional organic solvent in the art to be used for the same purpose as the process oil.

Process oils and organic solvents are mainly used as softeners and are added for mastication/mixing of natural rubber or synthetic rubber, which facilitates mixing of polymers and dispersion of a compounding agent. It is also used to facilitate workability of, for example, mixing molding and to save heat and time consumption.

Any process oil may be used without limitation as long as it may be easily absorbed and penetrated into the vinylacetate-ethylene (VAE)-based redispersible polymer powder according to the present invention and causes swelling. For example, naphthenic oil, paraffin oil or olefin oil derived from petroleum fractions, aromatic oil, mineral oil, vegetable oil, synthetic oil, lubricating oil or regenerated oil of the related art may be used. The above-mentioned components may be used singly, or at least two or more oils may be used in combination. As used herein, the oil in which the number of carbon atoms of a paraffinic hydrocarbon accounts for 50% or more of the total carbon atoms is referred to as a paraffinic oil, the oil in which the number of carbon atoms of a naphthenic hydrocarbon accounts for 30 to 45% of the total carbon atoms is referred to as a naphthenic oil, and the oil in which the number of carbon atoms of an aromatic hydrocarbon accounts for 35% or more of the total carbon atoms is referred to as an aromatic oil.

In one embodiment, the process oil may be at least one of a paraffinic or naphthenic oil, and preferably, a naphthenic oil having a naphthenic content (CN) of 20 to 50 wt %, and a paraffinic oil having a paraffinic content (CP) of 50 to 80 wt %.

Any conventional organic solvent used in the art for the same purpose as the process oil may be used. Non-limiting examples of organic solvents may include hydrocarbon-based solvents, halogenated hydrocarbon solvents, alcohol-based solvents, aldehyde-based solvents, ether-based solvents, ester-based solvents, ketone-based solvents, and glycol derivative solvents. The above-mentioned components may be used singly, or at least two or more organic solvents may be used in combination.

In the redispersible polymer powder composition according to the present invention, the content of the solvent is not particularly limited, and may be in a range from 0.50 to 50 wt % with respect to the total weight of the vinylacetate-ethylene (VAE)-based redispersible polymer and the solvent. Specifically, it may be 0.1 to 40 wt %, and more specifically, 1 to 40 wt %. When the content of the solvent is within the above range, it is possible to appropriately adjust the amount of the solvent absorbed in the vinylacetate-ethylene (VAE)-based redispersible polymer, thereby providing excellent compatibility and workability.

The redispersible polymer powder composition according to an embodiment of the present invention may further include a conventional crosslinking agent known in the art.

The crosslinking agent is a material that is present in an unreacted state at room temperature, and initiates a crosslinking reaction to form a crosslinked structure when it is included in an asphalt composition and a high temperature is applied thereto. The crosslinking agent according to the present invention may use a conventional thermosetting crosslinking agent known in the art, and may include, for example, at least one selected from the group consisting of an organic peroxide crosslinking agent, a silane crosslinking agent, an azo crosslinking agent, a polyisocyanate crosslinking agent, sulfur and a sulfide.

Non-limiting examples of a crosslinking agent may include dicumyl peroxide (DCP), dibenzoyl peroxide (DBP), methyl-ethyl-ketone peroxide (MEKP), t-butyl peroxybenzoate, di-2-ethylhexyl peroxyneodecanoate, t-butyl peroxypivalate, di-isopropyl peroxydicarbonate, bis (2,4-dichlorobenzoyl) peroxide, 1,1-bis (t-butylperoxy)-3,3,5-trimethyl chlorohexane, 2,5-dimethyl-2,5-bis (t-butylperoxy) hexane, t-butyl peroxyneodecanoate, t-butyl peroxy-2-ethylhexanoate, di-3-methoxybutyl peroxydicarbonate, di-3,5,5-trimethylhexanonyl peroxide, t-butylperoxy acetate, sulfur or sulfide. The above-mentioned components may be used singly or in combination of two or more. Preferably, it may be sulfur or sulfide. Examples of the sulfur may include natural sulfur, a sulfur substance produced by desulfurization of petroleum or natural gas, or modified sulfur in which general properties of sulfur are modified by, for example, dicyclopentadiene (DCPD).

A content of the crosslinking agent is not particularly limited, and may be in a range from 0.1 to 12 parts by weight, specifically, from 0.5 to 10 parts by weight, with respect to 100 parts by weight of the redispersible polymer powder composition. In a case where the content of the crosslinking agent is less than 0.1 part by weight, the effect obtained by the use of the crosslinking agent is insufficient and the crosslinking reaction does not occur smoothly. In a case where the content exceeds 12 parts by weight, the crosslinking does not cause melting at the melting point or higher, and it becomes difficult to manufacture a product of uniform quality.

Hereinafter, a method of fabricating a redispersible polymer powder composition according to an embodiment of the present invention will be described. However, the present invention is not limited to the following fabrication methods, and the steps of each process may be modified or optionally mixed as required.

A preferred embodiment of the method may include: mixing a vinylacetate-ethylene (VAE)-based redispersible polymer powder and a solvent at a weight ratio of 50 to 99.5:50 to 0.5; and mixing and stirring the mixture at a temperature of 20 to 180° C. for 0.2 to 3 hours.

Hereinafter, the fabricating method will be described for each process.

In order to prepare a pre-swelled vinylacetate-ethylene (VAE)-based redispersible polymer powder, a vinylacetate-ethylene (VAE)-based redispersible polymer powder is mixed with a solvent, serving as a swelling agent, at a predetermined mixing ratio. In this case, the mixing ratio of the vinylacetate-ethylene (VAE)-based redispersible polymer and the solvent may be 50 to 99.5:50 to 0.5 by weight, specifically 60 to 99.5:40 to 0.5 by weight. When the mixing ratio is within the above-mentioned range, excellent compatibility and workability may be exhibited without degrading physical properties, due to the pre-swelled vinylacetate-ethylene (VAE)-based redispersible polymer powder.

The vinylacetate-ethylene (VAE)-based redispersible polymer powder may include 70 to 99.9 wt % of a vinylacetate-ethylene (VAE)-based copolymer; and 0.1 to 30 wt % of a filler, with respect to the total weight of the vinylacetate-ethylene (VAE)-based redispersible polymer powder.

If necessary, 0.1 to 12 parts by weight of a crosslinking agent may be added with respect to the total weight (for example, 100 parts by weight) of the vinylacetate-ethylene (VAE)-based redispersible polymer composition.

Then, the mixture is stirred to be mixed at a temperature of 20 to 180° C. for 0.2 to 3 hours, and specifically 0.5 to 3 hours. In the stirring step, a conventional mixer known in the art may be used. For example, a mixer or a homogenizer may be used. A mixing speed is not particularly limited, and may be, for example, 100 to 500 rpm.

Conventional polymer modifiers require special production processes such as high temperature heating, long mixing time, high-speed agitating homogenizer for melting and mixing of polymers, which leads to a problem of increased processing cost and less productivity. On the other hand, the redispersible polymer powder composition of the present invention prepared in the above-described manner partially includes a solvent, thus including a pre-swelled vinylacetate-ethylene (VAE)-based redispersible polymer powder, and accordingly, it is excellent in workability and easy for handling, and shows excellent compatibility with asphalt, as compared to the conventional polymer modifiers. In addition, it is economical to reduce the production cost and may increase productivity by shortening manufacturing process and manufacturing time.

<Asphalt Composition>

An asphalt composition according to one embodiment of the present invention is a polymer-modified asphalt composition including the above-described pre-swelled redispersible polymer powder composition as a modifier.

Specifically, the asphalt composition includes an asphalt and the redispersible polymer powder composition, and may further include a conventional additive known in the art.

Any conventional asphalt component used in a conventional asphalt composition may be used as the asphalt. For example, natural asphalt, petroleum asphalt or an asphalt mixture may be used. Suitable kinds of asphalt for use in the present invention are those commonly used in any of the applications listed above, such as, but not limited to, asphalt reflected by the three systems typically used to grade asphalt: penetration grading system (ASTM D D946/D946M-09a) ("penetration grade"), viscosity grading system (ASTM D3381-09) ("viscosity grade") and the commonly used system in the U.S., the performance grading system (ASTM D6373-15) ("performance grade").

The asphalt used in the present invention also includes, but is not limited to, natural products such as lake asphalt, gilsonite, and natural rock asphalt. Further, it includes crude petroleum residues, such as, but not limited to, paraffin base, mixed base, and asphalt base. The asphalt base further includes, for example, asphalt cements, oxidized asphalts and liquid asphalts, which further includes cutbacks and road oils and emulsions, or any of the above combinations thereof. Still further, the bituminous materials used in the present invention include, tars, for example, from a coal destructive distillation and cracking of petroleum vapors or any combinations thereof.

While the composition of the asphalt composition depends on the end-use application and the required properties, it generally comprises 60 to 99% by weight, preferably 70 to 98% by weight of the asphalt, and more preferably 80 to 95% by weight of asphalt, in each case based on the total weight of the asphalt composition.

In general the asphalt composition is obtained by the addition of 1 to 40% by weight, preferably 1 to 30% by weight, and more preferably 1 to 20% by weight of pre-swelled dispersible vinylacetate-ethylene (VAE)-based dispersible polymer powder composition, in each case based on the total weight of the asphalt composition.

As another example, the asphalt composition according to the present invention may include an asphalt; and 10 to 50 parts by weight, specifically 20 to 40 parts by weight, of the redispersible polymer powder composition with respect to 100 parts by weight of the asphalt. Optionally, 10 to 50 parts by weight of an additive, preferably calcium carbonate, may be included with respect to 100 parts by weight of the asphalt. Calcium carbonate ($CaCO_3$) may increase the storage stability of the asphalt and may improve the coating thickness and the strength of the asphalt.

In addition to the above-described components, the asphalt composition according to one embodiment of the present invention may further include a conventional polymer modifier known in the art.

Generally, the polymer modifying additive may be classified into rubber series, thermoplastic series, thermoplastic elastomer series, copolymer series, peeling reduction series, compaction improving additive series, and fluidity improving agent series.

Examples of the rubber series may include natural rubber, butadiene rubber, polyisoprene, isobutylene-isoprene rubber, and polychloroprene rubber. Examples of the thermoplastic resin series may include polyethylene, polypropylene, polystyrene, nylon, acryl, and polyvinyl chloride. Examples of the thermoplastic elastomer series may include styrenic block copolymers (TPES), thermoplastic polyolefin elastomers (TPO), thermoplastic vulcanizates (TPV), thermoplastic polyurethanes (TPU), thermoplastic copolyester (TPC), thermoplastic poly-amides (TPA), and not classified thermoplastic elastomers (TPZ). In addition, examples of the copolymer series may include an acrylonitrile butadienestyrene (ABS) resin, a styrene/butadiene (SBR) copolymer, styrene butadienestyrene (SBS) copolymer, a nitrile butadienerubber (NBR), styrene-acrylonitrile (SAN), styrene-isoprenestyrene (SIS), ethylene-vinylacetate (EVA), and vinylacetate-ethylene (VAE). Examples of the peeling reduction series may include surfactants of amine series. Examples of the compaction and fluidity improving agents may include natural vegetable oils, mineral oils and synthetic process oils. The above-mentioned components may be used singly or in combination of two or more.

The selection of other additives and the proportion thereof is state of the art and is well known to the skilled worker. These additives include, but are not limited to, hydrocarbon resins, pitch pine, rosin esters, extender oils, naphthalenic or paraffinic oils, acids such as phosphoric or polyphosphoric acid, polyamines, stabilizers, solvents, waxes, etc., or combinations thereof.

Further, additives such as limestone, chalk, graphite, talc, fly ash, quartz powder, glass fiber or cellulose fiber. The selection of the polymer-modified asphalt composition and the amount of filler used in the polymer-modified asphalt composition depends on the intended use of the polymer-modified asphalt composition and is well known to the skilled worker.

Further examples of conventional additives may include anti-aging agents, corrosion inhibitors, biocides, pigments or processing aids, such as, for example, lubricants. The general amount is defined by both the application and the use of other polymers and is well known to the skilled worker.

The preparation of the asphalt composition has no special limitations and is carried out in the manner known from the prior art. Usually, all components are intensively mixed in an agitated vessel at elevated temperatures of 155° C. to 195° C. The blend may be processed, for example by calendering or other suitable technologies such as coating, grinding, lubricating, spreading, laminating, extrusion etc.

The asphalt composition of the present invention may be used for the production of asphalt sheets for waterproofing application, paving, sealing, drainage, roofing, etc.

The polymer modified asphalt composition of the present invention configured as described above exhibits excellent compatibility and miscibility with asphalt to reduce the production cost and increase the productivity, as well as exhibiting a physical property of at least the same level as that of the conventional polymer modifier.

As an example, the asphalt composition may satisfy at least one of the following physical conditions of (i) to (iii), and specifically preferably satisfies all the physical properties of (i) to (iii). For example, (i) a maximum rotational viscosity (based on 135° C.) of an asphalt film measured in accordance with the ASTM D4402 standard is substantially equal to or less than 5,000 cps, and specifically 700 to 5,000 cps. In addition, (ii) a low-temperature cracking temperature of an asphalt film measured in accordance with the ASTM D790 standard, ISO178, BS3416 or JMMA Appendix 1 is substantially equal to or lower than −15° C., and specifically in a range from −15 to −25° C. In addition, (iii) a surface tackiness of an asphalt film fabricated in accordance with the BS3900 or BS3416 standard is substantially equal to or less than 3. As used herein, the surface property was evaluated by quantifying a degree of surface stain and tackiness in a scale of 0 to 5.

Hereinafter, the present invention will be described in detail with reference to exemplary embodiments. However, the following embodiments are illustrative only, and the present invention is not limited by the following embodiments.

Reference Example

A vinylacetate-ethylene (VAE)-based solid dispersible polymer powder (DPP) produced by Wacker Chemie AG was used as the vinylacetate-ethylene (VAE)-based redispersible polymer in the Exemplary Embodiments and Experimental Examples, where VAE1 was WACKER VINNEVA® SV1 and VAE2 is WACKER VINNEVA® SV2.

In addition, the process oil is a paraffinic process oil, in a main component of which, a naphthenic (CN) content of the hydrocarbon composition according to the ASTM D 2140 "Standard Practice for Calculating Carbon-Type Composition of Insulating Oils of Petroleum Origin" is about 20 to 50%, and a paraffinic (CP) content thereof is about 50 to 80%.

Exemplary Embodiments 1 to 4

The vinylacetate-ethylene (VAE)-based redispersible polymer and the process oil were input to a mixer according to the composition shown in the following Table 1, and stirred at 300 rpm for 30 minutes at room temperature of about 28° C. to prepare redispersible polymer compositions of Exemplary Embodiments 1 to 4. In Table 1, the mixing ratio of each composition is a weight ratio.

Experimental Example 1: Evaluation of Swelling Ratio

The miscibility and compatibility of the vinylacetate ethylene (VAE)-based redispersible polymer powder were evaluated as follows.

Specifically, a vinylacetate ethylene (VAE)-based redispersible polymer powder, which is a polymer modifier to be evaluated, was mixed with a process oil (PO) in a weight ratio of 1:1 and 1:0.5, and the mixtures were stirred at 300 rpm at room temperature of about 28° C. for 30 minutes. Then, a ratio of swelling (dissolving) of the vinylacetate ethylene (VAE)-based redispersible polymer powder was checked by the property before and after adding the process oil (PO). In such a case, styrene butadiene styrene (SBS) copolymer pellet, which is a typical polymer modifier, was used as a control group.

As a result of the experiment, the redispersible polymer composition using the SBS copolymer showed a swelling ratio of 55% to the process oil (PO). On the other hand, in the case where the vinylacetate ethylene (VAE)-based redispersible polymer powder (e.g., VAE1 and VAE2) was used, the swelling ratio was 77 to 81%, indicating that the swelling ratio to process oil was increased by 22% or more, and by about 26% at maximum, as compared to the case of using SBS.

Figure 2:
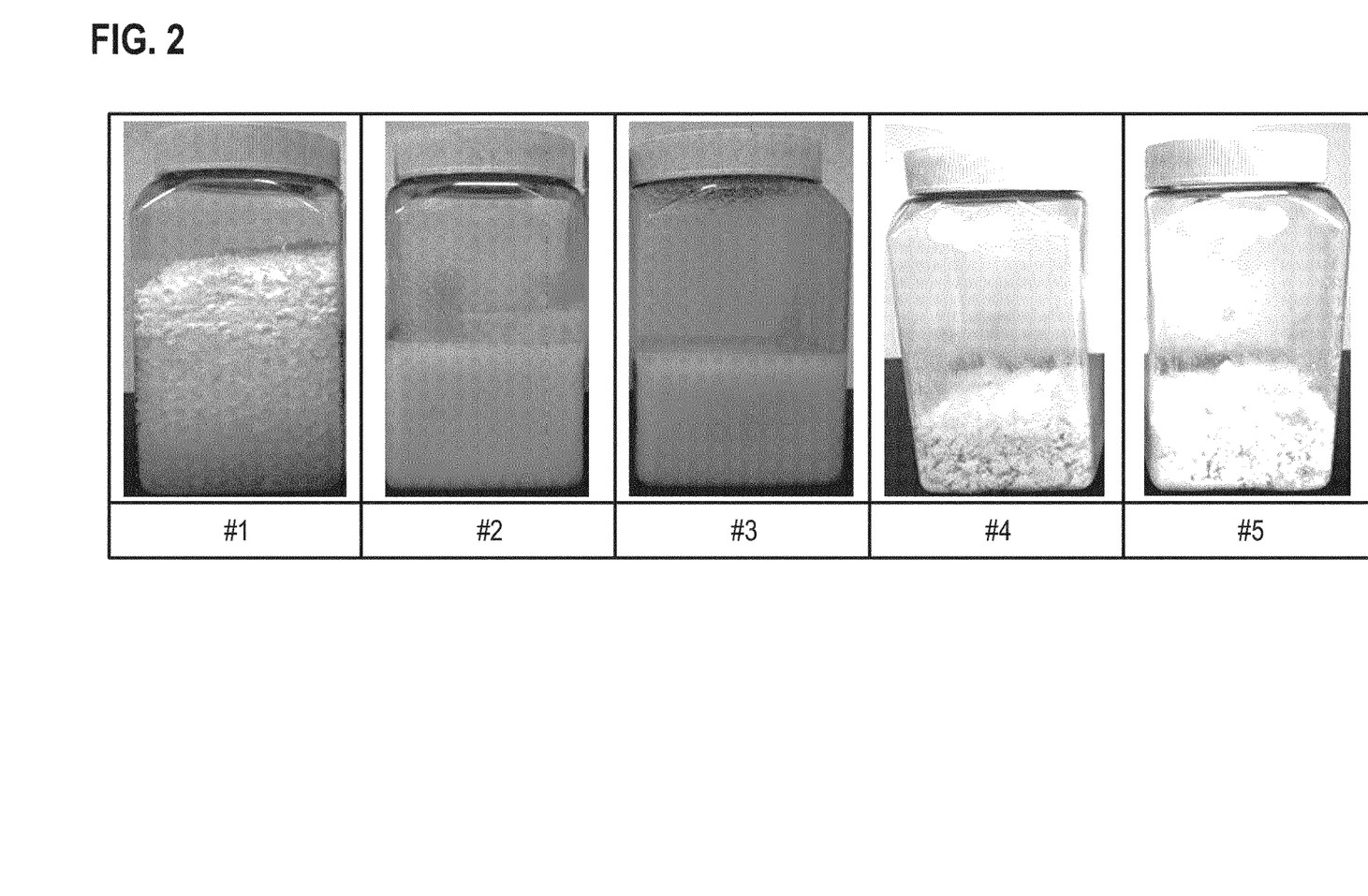
FIG. 2 is a photograph showing a variation of a swelling ratio of a styrene butadiene/styrene (SBS)-based copolymer modifier and a vinylacetate-ethylene (VAE)-based redispersible polymer based on adjustment of a mixing ratio of a process oil.

In addition, when visually evaluated, the degree of plasticization and dissolution (Degree P+D) in the vinylacetate ethylene (VAE)-based redispersible polymer of the present invention exhibited 60% or more. On the other hand, under the same conditions, the degree of plasticization and dissolution (Degree P+D) in the case of using SBS were 10% or less by visual evaluation, which is significantly lower than that of the vinylacetate ethylene (VAE)-based redispersible polymer of the present invention (see Table 1 and FIG. 2).

TABLE 1

| Composition | Mixing ratio | Swelling ratio (%) | Degree P + D (Visual evaluation) |
|---|---|---|---|
| #1 Comparative Example 1 | SBS:PO = 1:1 | 55 | Partial swelling (10% or less) |
| #2 Exemplary Embodiment 1 | VAE1:PO = 1:1 | 77 | Partial swelling of 60% or more |
| #3 Exemplary Embodiment 2 | VAE2:PO = 1:1 | 81 | Partial swelling of 60% or more |
| #4 Comparative Example 2 | SBS:PO = 1:0.5 | 34 | Partial plasticization (5% or less) |
| #5 Exemplary Embodiment 3 | VAE1:PO = 1:0.5 | 47 | Partial swelling (20% or more) |
| #6 Exemplary Embodiment 4 | VAE2:PO = 1:0.5 | 50 | Partial swelling (20% or more) |

Experimental Example 2: Evaluation of Miscibility with Asphalt Composition

In order to evaluate the miscibility between the vinylacetate-ethylene (VAE)-based redispersible polymer powder composition and the asphalt, changes in surface tackiness, the low temperature cracking, and viscosity were each measured as follows.

In specific, the vinylacetate-ethylene (VAE)-based redispersible polymer and the process oil were mixed at predetermined mixing ratios, respectively, and stirred at 300 rpm at room temperature of about 28° C. for 10 minutes to form a redispersible polymer powder composition. Then, 100 parts by weight of asphalt (AP3) preheated to 160 to 180° C. and 50 parts by weight of calcium carbonate were added to 40 parts by weight of the redispersible polymer powder composition, and mixed for about 1 hour or more to prepare an asphalt compound. In such a case, a mixing ratio of the asphalt compound for asphalt, redispersible polymer powder composition, and calcium carbonate was 100:30 to 40:50 by weight. The asphalt compound prepared as above was cured at room temperature for about one day, and the cured asphalt compound film was used as a test sample.

In the case of a SBS copolymer pellet, which is a typical polymer modifier, stirring should be carried out at a speed of 3000 rpm or more and a temperature of 170 to 185° C. for 4 to 6 hours by using an expensive homogenizer for homogeneous mixing with asphalt. On the other hand, when the pre-swelled vinylacetate-ethylene (VAE)-based redispersible polymer powder composition of the present invention is used, it was found that it may be easily mixed with asphalt even if it is mixed for a short time of 1 to 2 hours at a relatively low temperature of 160 to 170° C. by using a general mixer.

(1) Evaluation of Surface Property

The surface property, the tackiness and the touch dry state of the asphalt compound film were evaluated as follows.

The test was performed in accordance with the BS3900 or BS3416 standards, and the evaluation criteria are shown in Table 2 below.

TABLE 2

| Level | Stain Level Condition | Tackiness Level Condition |
|---|---|---|
| 0 | There are no stains and fingerprints on the film surface and fingers. | There is no tackiness, and there are no stains on the fingers. |
| 1 | There are no stains, but fingerprints are slightly left on the film surface. | There is a slight tackiness with fingers, but there are no stains on the fingers. |
| 2 | There are no stains, but fingerprints are little left on the film surface. | There is a little tackiness with fingers, but there are no stains on the fingers. |

TABLE 2-continued

| Level | Stain Level Condition | Tackiness Level Condition |
|---|---|---|
| 3 | The fingerprint remains clear on the film surface. | There is a less strong tackiness with fingers. |
| 4 | There are some stains on the fingers and the film surface is partially damaged by the fingers. | There is a strong tackiness with fingers. |
| 5 | There are some stains on the fingers the film surface is very severely damaged by the fingers. | There is a highly strong tackiness with fingers. |

Specifically, the surface property and the degree of tackiness of the asphalt compound film were evaluated by about 15 seconds of touching of the surface of the asphalt compound film cured at room temperature for about one day. The evaluation was repeated three times, and the test results were quantified from 0 to 5. In the case, when the numerical value increased from 0 to 5, more stains and higher tackiness were observed. Thereafter, the degree of surface tackiness was finally calculated by the formula degree of surface tackiness=(stain level+tackiness level)/2, which is based on the degree of stain and the degree of tackiness as described above. The results are shown in Table 3 below.

TABLE 3

|  | #7 | #8 | #9 | #10 | #11 | #12 |
|---|---|---|---|---|---|---|
| Modifier content | — | SBS:PO (1:1) | VAE2:PO (1:1) | VAE2:PO (1:0.5) | VAE2:PO (1:0.4) | VAE2:PO (1:0.1) |
| Composition content | Asphalt (AP3) | AP3:SBS:CaCO$_3$ = 100:40:50 | AP3:Redispersible polymer powder composition (pre-swelled VAE):CaCO$_3$ = 100:40:50 | | | |
| Degree of surface tackiness | 1 | 3 | 4.5 | 4 | 2.2-3.0 | 0.5 |

Figure 3:
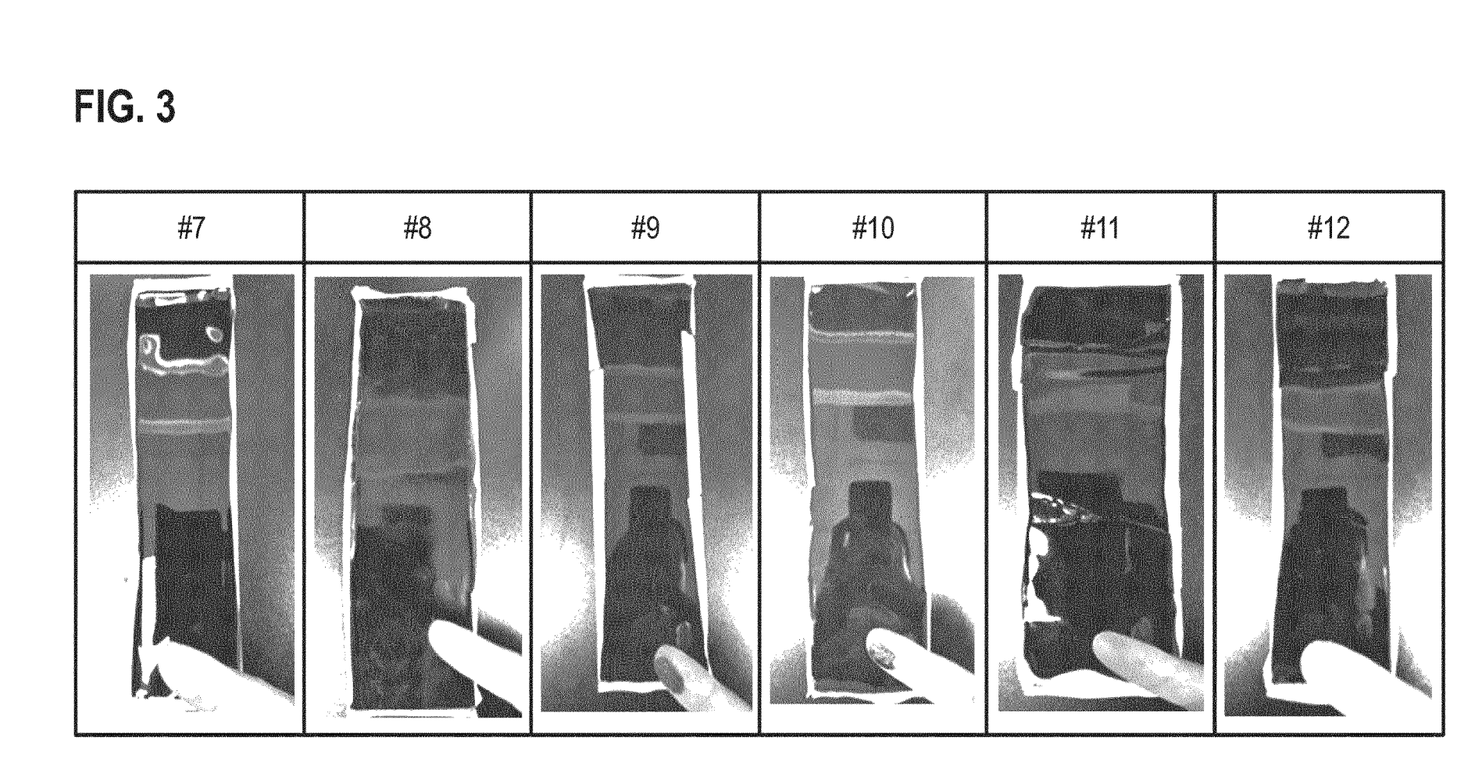
FIG. 3 shows the results of the surface property, the tackiness and the touch dry state of the asphalt compound films.

As a result, the degree of surface tackiness was about 3 when the SBS-based copolymer modifier was used. When the amount of process oil added to the vinylacetate-ethylene (VAE)-based redispersible polymer powder increases, the miscibility with the asphalt may be improved, but the surface stain and tackiness may increase. In the present invention, it was identified that when the mixing ratio of the vinylacetate-ethylene (VAE)-based redispersible polymer and the process oil is adjusted to 1:0.5 or less by weight, it is effective to reduce surface stain and tackiness (see Table 3 and FIG. 3).

(2) Low Temperature Cracking

In order to evaluate the bending resistance at low temperature, the produced asphalt compound films were stored at −10° C., −15° C. and −20° C., respectively, for 1 hour, and then a bending test was evaluated to measure the temperature at which a crack occurs. In such a case, the evaluation was carried out in accordance with the standards of ASTM D4402, ISO178, BS3416 or JMMA Appendix 1.

Figure 4:
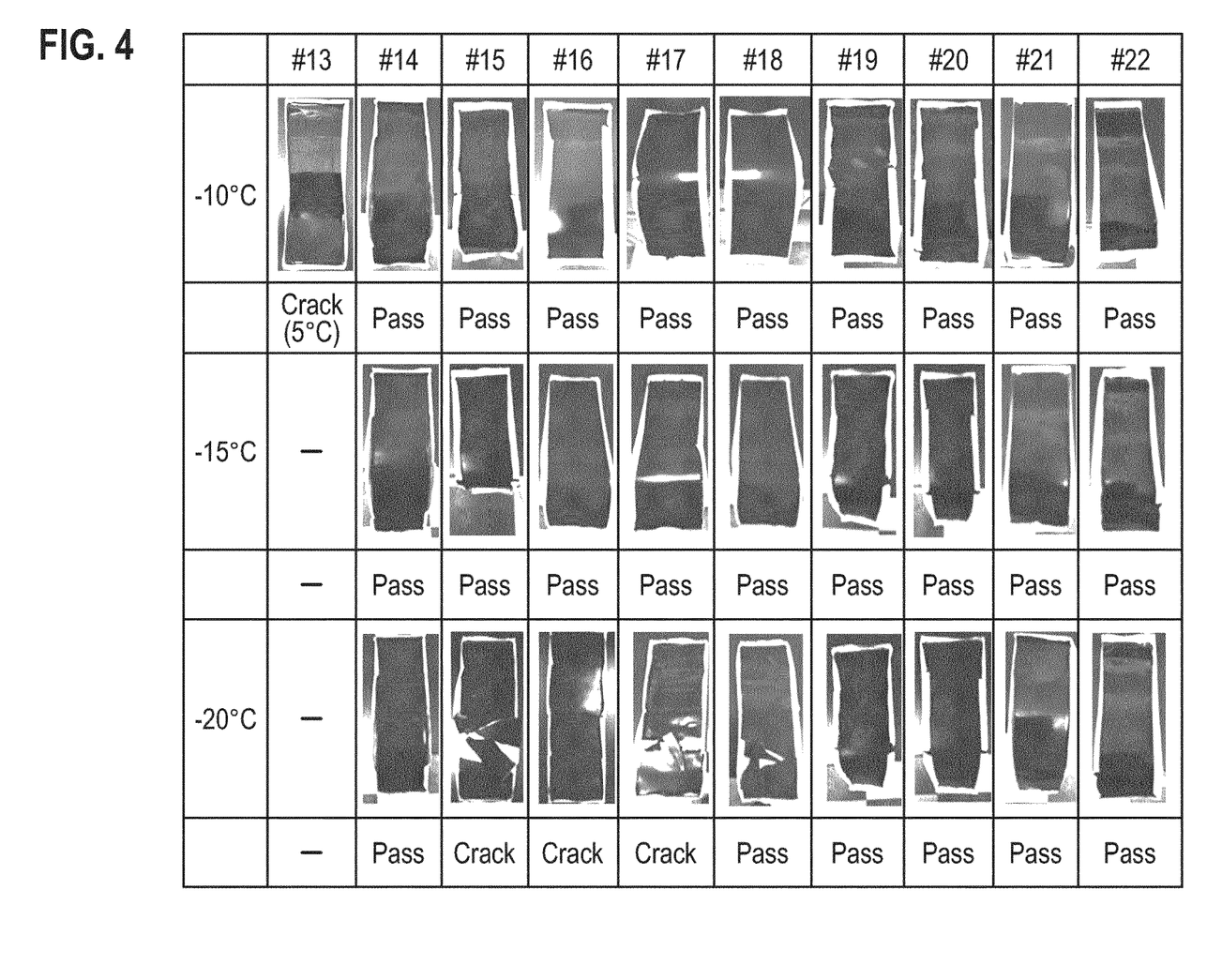
FIG. 4 shows the bending resistance of the asphalt compound films stored at −10° C., −15° C. and −20° C.

As a result, a crack easily occurs in a general asphalt (control group) including no polymer modifier at a temperature of 5° C. or less. On the other hand, the asphalt compound including the pre-swelled vinylacetate-ethylene (VAE)-based redispersible polymer powder composition was found to have improved thermal stability as cracks occurred at a low temperature of about −15° C. or lower. In particular, in the case of an asphalt compound including a crosslinking agent (X-link) in a pre-swelled vinylacetate-ethylene (VAE)-based redispersible polymer powder composition, no crack occurred even at a low temperature of −20° C. or lower, and it was found to exhibit thermal stability of the substantially same level as that of the asphalt compound including an SBS-based modifier (see Table 4 below and FIG. 4).

TABLE 4

|  | #13 | #14 | #15 | #16 | #17 | #18 | #19 | #20 | #21 | #22 |
|---|---|---|---|---|---|---|---|---|---|---|
| MC | — | SBS:PO (1:1) | VAE1:PO (1:1) | VAE2:PO (1:1) | VAE1:PO (1:0.5) | VAE2:PO (1:0.5) | VAE1:PO (1:1) | VAE2:PO (1:1) | VAE1:PO (1:0.5) | VAE2:PO (1:0.5) |
| CC | Asphalt (AP3) | AP3:SBS:CaCO$_3$ = 100:40:50 | AP3:VAE Solution:CaCO$_3$ = 100:40:05 | | | | AP3:VAE solution:CaCO$_3$:X-link = 100:40:50:0.7 | | | |

MC = Modifier Content,
CC = Composition Content (4) Viscosity

The rotational viscosity was measured at 135° C. using an asphalt compound film. In such a case, the evaluation was performed in accordance with the ASTM D4402 standards Test "Standard Test Method for Viscosity Determination of Asphalt at Elevated Temperatures Using a Rotational Viscometer".

Figure 5:
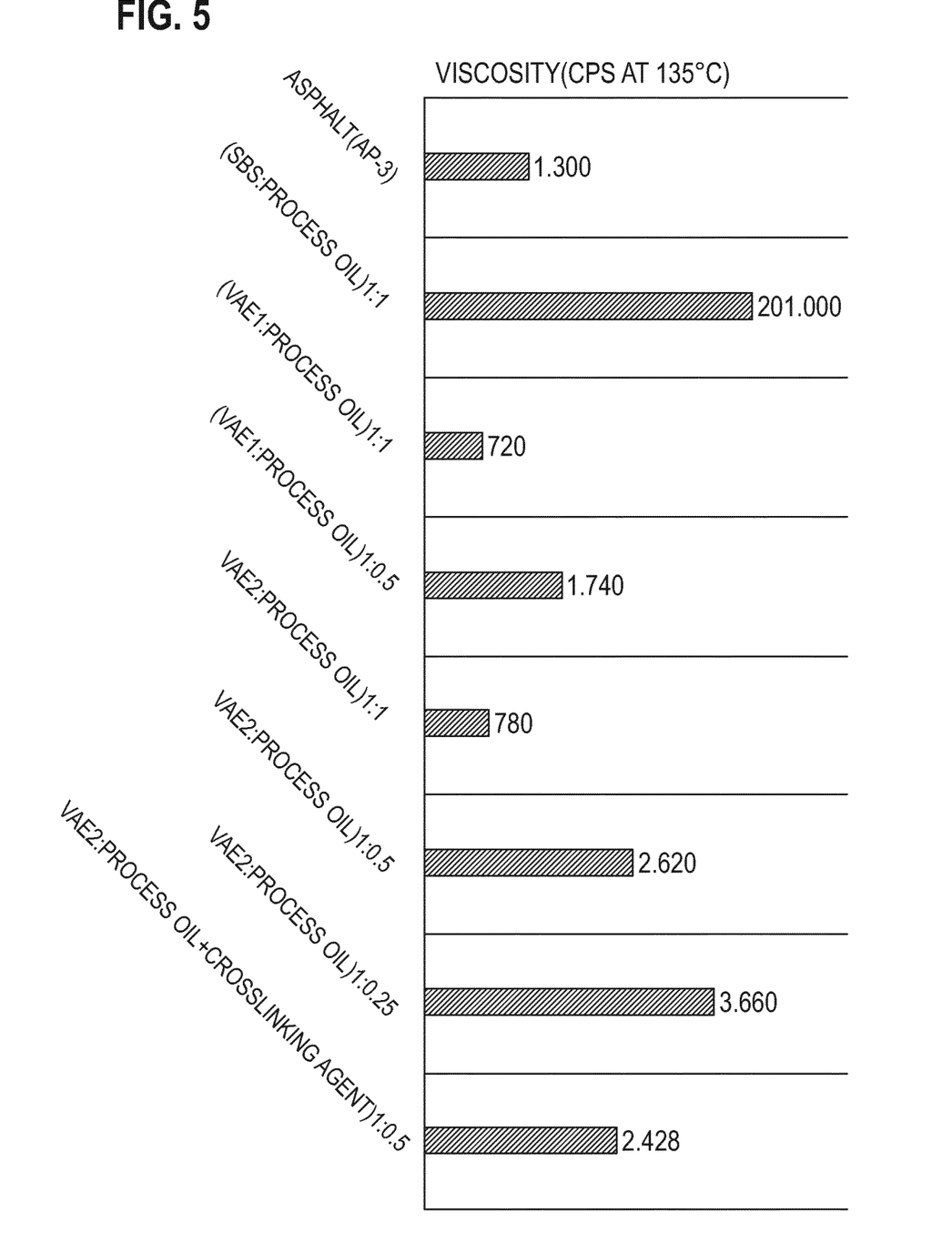
FIG. 5 is a graph showing viscosity characteristics of an asphalt film in accordance with the ASTM D4402 test standard.

As a result, the general asphalt (control group) including no polymer modifier showed a viscosity of 1,300 cps. On the other hand, the SBS copolymer, which is a conventional representative polymer modifier in the art, shows a high viscosity of about 201,000 cps, thus indicating that commerciality and workability are poor. On the other hand, the pre-swelled vinylacetate-ethylene (VAE)-based redispersible polymer powder composition according to the present invention showed a viscosity of 720 to 3,660 cps, and it was appreciated that viscosity could be variously adjusted according to the content of the process oil (see FIG. 5).

From the above results, it may be appreciated that the pre-swelled vinylacetate-ethylene (VAE)-based redispersible polymer powder composition according to the present invention has a viscosity the level of which is substantially the same as that of general asphalt (control group) that includes no polymer modifier, and is significantly lower than that of the SBS polymer modifier conventionally used representatively. Accordingly, it may be appreciated that the pre-swelled vinylacetate-ethylene (VAE)-based redispersible polymer powder composition was excellent in miscibility and compatibility with asphalt, even if it is mixed for a short time of about 1 to 3 hours at a low temperature of 160 to 170° C. by using a general mixer.

The invention claimed is:

1. A redispersible polymer powder composition, comprising a vinylacetate-ethylene (VAE)-based redispersible polymer powder pre-swelled by at least one solvent selected from a process oil and an organic solvent, wherein the swelling ratio of the vinylacetate-ethylene (VAE)-based redispersible polymer powder exceeds 55%, measured by the equation swelling ratio (%)=[(B−A)/A]×100, where A is the initial mass of the vinylacetate-ethylene (VAE)-based redispersible polymer powder before adding the solvent, and B is the swelled mass of the vinylacetate-ethylene (VAE)-based redispersible polymer powder after adding the solvent and stirring at 300 rpm at room temperature (20° C.) for 30 minutes provided that the mixing ratio of the vinylacetate-ethylene (VAE)-based redispersible polymer powder and the solvent is 1:1 by weight, wherein the vinylacetate-ethylene (VAE)-based redispersible polymer powder comprises a vinylacetate-ethylene (VAE)-based copolymer having a vinylacetate content more than 50 wt % and substantially equal to or less than 99 wt %, and an ethylene content substantially equal to or more than 1 wt % and less than 50 wt %, wherein the vinylacetate-ethylene (VAE)-based redispersible polymer powder is water dispersible and obtained by spray drying an aqueous vinylacetate-ethylene (VAE)-based dispersion, wherein the composition further comprises 0.1 to 12 parts by weight of a crosslinking agent with respect to 100 parts by weight of the composition.

2. The redispersible polymer powder composition of claim 1, wherein the vinylacetate-ethylene (VAE)-based redispersible polymer powder comprises a filler.

3. The redispersible polymer powder composition of claim 1, wherein the vinylacetate-ethylene (VAE)-based copolymer has a vinylacetate content more than 55 wt % and substantially equal to or less than 99 wt %, and has an ethylene content substantially equal to or more than 1 wt % and less than 40 wt %.

4. The redispersible polymer powder composition of claim 1, wherein the vinylacetate-ethylene (VAE)-based copolymer has a glass transition temperature (Tg) in a range from −40 to 40° C.

5. The redispersible polymer powder composition of claim 2, wherein the filler selected from the group comprising an organic filler, or an inorganic filler, or a mixture thereof.

6. The redispersible polymer powder composition of claim 2, wherein the content of the filler is in a range from 0.1 to 30 wt % with respect to 100 wt % of the vinylacetate-ethylene (VAE)-based redispersible polymer powder.

7. The redispersible polymer powder composition of claim 1, wherein the process oil comprises at least one selected from the group consisting of a naphthenic oil, a paraffinic oil, an olefin-based oil, an aromatic oil, a mineral oil, a vegetable oil, a synthetic oil, a lubricating oil, and a regeneration oil.

8. The redispersible polymer powder composition of claim 1, wherein the organic solvent comprises at least one selected from the group consisting of a hydrocarbon-based solvent, a halogenated hydrocarbon-based solvent, an alcohol-based solvent, an aldehyde-based solvent, an ether-based solvent, an ester-based solvent, a ketone-based solvent and a glycol-based solvent.

9. The redispersible polymer powder composition of claim 1, wherein the crosslinking agent comprises at least one selected from the group consisting of an organic peroxide crosslinking agent, a silane crosslinking agent, an azo crosslinking agent, a polyisocyanate crosslinking agent, sulfur and sulfide.

10. An asphalt composition, comprising an asphalt, and the redispersible polymer powder composition of claim 1.

11. The asphalt composition of claim 10, which satisfies at least one of the followings conditions (i) to (iii), which are (i) the maximum viscosity (based on 135° C.) measured in accordance with the ASTM D4402 standard is substantially equal to or less than 5,000 cps, (ii) the low-temperature cracking temperature measured in accordance with the ASTM D790 standard is substantially equal to or lower than −15° C., and (iii) the surface tackiness of an asphalt film fabricated in accordance with the BS 3900 standard is substantially equal to or less than 3.

* * * * *